United States Patent [19]
Guzik

[11] Patent Number: 5,789,756
[45] Date of Patent: Aug. 4, 1998

[54] APPARATUS FOR MEASURING THE FLYING HEIGHT AND ORIENTATION OF A MAGNETIC HEAD RELATIVE TO TRANSPARENT MEDIUM BASED ON FRUSTRATED TOTAL INTERNAL REFLECTION

[75] Inventor: Nahum Guzik, Palo Alto, Calif.

[73] Assignee: Guzik Technical Enterprises, San Jose, Calif.

[21] Appl. No.: 738,034

[22] Filed: Oct. 24, 1996

[51] Int. Cl.[6] .................................................. G01N 21/86
[52] U.S. Cl. ............................ 250/559.29; 250/559.28; 356/375
[58] Field of Search ................... 250/559.29, 559.28, 250/559.27, 235, 236; 356/375, 381, 358, 356; 359/222, 226

[56] References Cited

U.S. PATENT DOCUMENTS

| | | | |
|---|---|---|---|
| 3,338,656 | 8/1967 | Astheimer . | |
| 3,695,767 | 10/1972 | George et al. | 356/154 |
| 3,759,618 | 9/1973 | Rogers et al. | 356/372 |
| 4,165,155 | 8/1979 | Gordon, II et al. | 359/222 |
| 4,286,468 | 9/1981 | Altman | 359/222 |
| 4,322,979 | 4/1982 | Fromm | 359/222 |
| 4,451,123 | 5/1984 | McNeill et al. | 359/263 |
| 4,593,368 | 6/1986 | Fridge et al. | 356/357 |
| 4,624,564 | 11/1986 | Dahlgren | 356/243 |
| 4,813,782 | 3/1989 | Yagi et al. | 356/357 |
| 4,901,185 | 2/1990 | Kubo et al. | 360/104 |
| 4,961,123 | 10/1990 | Williams et al. | 360/131 |
| 5,220,408 | 6/1993 | Mager | 356/372 |
| 5,225,690 | 7/1993 | Sakai et al. | 250/559.09 |
| 5,257,093 | 10/1993 | Mager et al. | 356/375 |
| 5,280,340 | 1/1994 | Lacey | 356/357 |
| 5,311,287 | 5/1994 | Amer | 356/373 |
| 5,349,443 | 9/1994 | Guerra | 356/376 |
| 5,557,399 | 9/1996 | de Groot | 356/357 |

OTHER PUBLICATIONS

Bowen et al., "Interferometer Alignment Tool", IBM Technical Disclosure Bulletin, vol. 15, No. 12, pp. 3691–3672, May 1973.

Heinrich, "Semi-Automatic Flight Height Measuring for Magnetic Heads", IBM Technical Disclosure Bulletin, vol. 20, No. 4, p. 1503, Sep. 1977.

Makosch et al., "Measuring the Flight Height of Magnetic Heads on Magnetic Disks". IBM Technical Disclosure Bulletin vol. 15, No. 4 pp. 1322–1323, Sep. 1972.

Gordon II, J.G. et al., "Electrochromic Attenuated Total Reflection Modulator", IBM Tech. Disclosure Bull., vol. 22, No. 5, p. 2074 (Oct. 1979).

(List continued on next page.)

*Primary Examiner*—Que Le
*Attorney, Agent, or Firm*—Lappin & Kusmer LLP

[57] ABSTRACT

The invention provides an apparatus for measuring the flying height and orientation of a magnetic head (54) relative to a transparent disk (20) based on frustrated total internal reflection. The apparatus comprises a housing (10) that mounts an electric motor (12) which rotationally supports the aforementioned disk. The disk (20) has a tapered lateral surface (20c) with light emitting means (22) such as a laser (24) installed on one side of the disk lateral surface and a light detecting means (30) on a side of the disk diametrically opposite to the laser. The light is emitted from the laser (24) and is directed to the disk (20) perpendicular to the tapered lateral surface (20c) of the disk (20). The latter has a tapering angle of 45° so that the light is propagated through the body of the disk (20) in the channel region (49) with total internal reflection from two parallel surfaces (20a and 20b) of the disk into the body of the disk. As a result, when the magnetic head (44) to be tested is absent, the light detecting means (30) shows an area of homogeneous intensity of the reflected light. When, however, the magnetic head (44) approaches to the surface (20a) of the disk and is supported during rotation of the disk at a flying height, i.e., on an air cushion, the proximity of the head frustrates the total internal reflection. As a result, the intensity of the reflected light sensed by the detector (38) is reduced. The degree of this reduction can be translated through appropriate electronic means and computer (40) into the value of the flying height.

41 Claims, 4 Drawing Sheets

OTHER PUBLICATIONS

Burstein; E. et al., "Surface Polaritons—Propagating Electromagnetic Modes at Interfaces", J. Vac. Sci. Technol, vol. 11, No. 6, pp. 1004–1018, Nov./Dec. 1974.

Philpott, et al "Light Value Utilizing Surface Polaritons", IBM Tech. Disclosure Bull., vol. 23, No. 8A, pp. 3350, Jan. 1980.

Kirtley; J.R. et al., "Polarized, Angle-Tunable Light Source", IBM Tech. Disclosure Bull., vol. 23, No. 7A, pp. 3004–3005, Dec. 1980.

Everett, "Technique for Aligning Laser Mirrors Using Gas Laser" Rev. Sci. Inst., p. 375, Nov., 1965.

Durig, et al, "Near Field Optical Scanning Microscopy" J. Appl. Phys. vol. 59, No. 10, pp. 3318–3327 May 15, 1986.

McWhinney, "Trirail Slider with Low-Profile Center Rail", IBM Tech. Disc. Bull., vol. 20, No. 3, pp. 1202, Aug. 1977.

Grometer et al, "Compliant Head Mounting", IBM Tech. Disc. Bull., vol. 5, No. 1, Jun. 1962, p. 34.

Reich, "Multi-Core Magnetic Head", IBM Tech. Disc. Bull., vol. 13, No. 9, Feb. 1971, p. 2641.

C.J. Lin, et al, "Transition on Perpendicular Rigid Disks in Quasi-Contact", IEEE Trans on Magnetics vol. Mag. 21, No. 5, Sep. 1985, pp. 1359–1364.

G.L. Best et al., "Precise Optical Measurements of Slider Dynamics"; IEEE Transactions on Magnetics, vol. MAG-22, No. 5 pp. 1017–1018, Sep. 1986.

T. Ohkubo et al; "Accurate Measurement of Gas-Lubricated Slider Bearing Separation Using Visible Laser Interferometry"; Journal of Tribology Transactions of the ASME, pp. 1–6, Oct. 1987.

W. H. Hansen; "Electric Fields Produced by the Propagation of Plane Coherent Electromagnetic Radiation in a Stratified Medium", Journal of the Optical Society of America, vol. 58, No. 3, pp. 380–390, Mar. 1968.

K. Tanaka et al; "Measurements of Transient Motion of Magnetic Disk Slider"; IEEE Transactions on Magnetics, vol. MAG-20, No. 5 pp. 924–926, Sep. 1984.

J.M. Fleischer et al; "Infrared Laser Interferometer for Measuring Air-bearing Separation", IBM J. Res. Develop, pp. 529–533, Nov. 1974.

Y. Mizoshita et al; "Dynamic Characteristics of a Magnetic Head Slider"; IEEE Transactions on Magnetics, vol. MAG-21, No. 5, pp. 1509–1511, Sep. 1985.

S. Zhu et al., "Frustrated Total Internal Reflection: A Demonstration and Review", American Journal of Physics, vol. 54, No. 7, pp. 601–607, Jul. 1986.

John M. Guerra, "Photon Tunneling Microscopy", Applied Optics, vol. 29, No. 26, pp. 3741–3752, Sep. 1990.

M. Suk et al., "Comparison of Flying Height Measurement Between Multi-Channel Laser Interferometer and a Capacitance Probe Slider", IEEE Transactions on Magnetics, vol. 27, No. 6, pp. 5148–5150, Nov. 1991.

Lin C. and Sullivan, R.F., "An application of white light interferometry in thin film measurements," IBM J. Res. and Dev., May 1972, p. 269.

Nigam, A., "A Visible Laser Interferometer for air bearing separation measurement to submicron accuracy", Trans. ASME J. Lub, Tech., Jan., 1982, p. 60.

Best, G.L., "Comparison of optical and compacitive measurements of slider dynamics," IEEE Trans Mag., vol. MAG 23, No. 5, p. 3453, Sep. 1987.

Muller, R.H. "Definitions and conventions in ellipsometry," Surface Science, vol. 16, p. 14, Jan. 1969.

Phase Metrics, "Dynamic Flying Height Tester", Phase Metrics, 3978 Sorrento Valley Blvd, San Diego, CA 92121.

APPARATUS FOR MEASURING THE FLYING HEIGHT AND ORIENTATION OF A MAGNETIC HEAD RELATIVE TO TRANSPARENT MEDIUM BASED ON FRUSTRATED TOTAL INTERNAL REFLECTION

FIELD OF INVENTION

The present invention relates to measuring nanometric distances between objects, particularly an optical apparatus for measuring a gap between a magnetic transducing head and a transparent medium as they move relative to one another. More specifically, the invention relates to an apparatus for measuring the flying height and orientation of a magnetic head with respect to a test disk in a flying-height tester.

BACKGROUND OF THE INVENTION

Most computer systems include a data storage device comprising of a rotating magnetic coated disk and a transducer for reading and writing information stored on the magnetic material of the disk. Such systems are normally characterized by storage density, access speed to data locations, reliability, and data integrity. One of the principal parameters which significantly affects the system characteristics is the position of the magnetic transducing head relative to the rotating disk. The relative air flow between the disk rotating at a high rate and a head biased toward the disk causes the head to fly on an established cushion of air. Generally, the smaller is the head-to-disk spacing the higher is accuracy of transduction of information stored on the disk. The head-to-disk spacing referred to as the "head gap" or a "flying height" for conventional high performance systems is on the order of several tens of nanometers. Flying aerodynamics vary for different heads, disks, rotation speeds resulting in different flying heights and head orientations. Therefore, in the design process, as well as in production, it is important to provide precise control of the flying height and orientation of the head to meet desired performance criteria.

At the present time, several optical techniques are used to measure a nanometric gap between a magnetic head and a rotating magnetic disk.

One measuring method is based on optical interferometry. This method uses a mutual interference effect wherein two optical beams produce lines, bands, or fringes which are either alternately light and dark or variously colored. In order to measure a gap between two objects having nearly parallel mutually facing surfaces, where one of the objects is transparent, a beam of light is directed into the gap to be measured through the body of the transparent object in such a way that the axis of the beam is essentially normal to the facing surfaces. Beams reflected from the surfaces of both objects are superimposed at a detector element and the interference fringes are read. It is known from optics that the detected light intensity depends on the ratio of the path difference between two beams to the radiation wavelength. This relationship is used as a calibration table for gap measurements as the path difference between the beams is twice the gap.

A particular application of optical interferometry for measuring the nanometric gap between a magnetic head and a flat reference disk made of an optically transparent material such as glass is disclosed in U.S. Pat. No. 4,813,782 issued in 1989 to Yagi et al. In the apparatus described in this patent, the operating conditions of a hard disk drive are simulated by rotating a reference disk with a high speed, and a magnetic head to be tested is biased toward the reference disk, e.g., by a spring, and flies above the disk on a dense air cushion. As a disk is rotating, a light beam is directed through the transparent reference disk from the side opposite to the magnetic head. The beams reflected from the surface of the disk and the surface of the head interfere with each other producing interference fringes. These fringes are detected and analyzed for determining the gap between the magnetic head and the reference disk using a calibration curve.

The main drawback of the above method is inaccuracy of the calibration curve near its maximum and minimum points, where measurement accuracy is significantly low due to small changes in the signal with the variation of the gap (so called "flat regions" of the calibration curve). This problem is especially pronounced in systems based on the above principle and intended for measuring head gaps that are much less than one quarter of the optical wavelength. Moreover, commercially available devices are unable to take measurements at several points on the magnetic head at the same time. Therefore, time consuming point-by-point measurements have to be performed in order to obtain a map of surface-to surface proximity.

Another optical method that is used to measure the gap between objects is known as frustrated total internal reflection. Total internal reflection is observed when a light beam falls onto an interface between two media at an oblique incidence angle. If the light propagates from the side of the optically denser of the two media and the incidence angle exceeds a certain critical value that depends on the ratio of the refractive indexes of the two media, all radiation is reflected back to the denser media.

It is further known that if the second medium is a thin film, followed by a third medium, which has a higher refractive index than the first one, a part of the incident radiation can penetrate the film and propagate into the third medium. In other words, the internal reflection is not total and therefore is called a frustrated total internal reflection. In this case of the frustrated total internal reflection, a fraction of radiation reflected back into the first medium depends on a ratio of the thickness of the second medium to the radiation wavelength, a complex refractive index of the third medium, and polarization of the incident radiation. Such systems are more sensitive to the variation of nanometric gaps and therefore are suitable for measuring gaps between a magnetic head and the reference disk with higher accuracy than the apparatuses based on the principle of optical interference.

An apparatus which determines the proximity of a stationary glass surface to another surface using the phenomenon of frustration of total internal reflection is disclosed in U.S. Pat. No. 4,681,451 issued to Guerra et al in 1987. In the apparatus, a glass block is used to substitute a conventional magnetic head. Its spacing from a magnetic disk is then imaged by a video camera detecting intensity distribution of the light reflected back into the glass. The magnetic disk may be rotated to simulate aerodynamic characteristics.

The main disadvantage of this proximity imaging device is its inability to test dynamic behavior and to measure the flying height of an actual magnetic head, as may be needed by a magnetic head manufacturer, or a consumer, for quality control purposes. Even though some of the conditions inside a disk drive can be simulated by executing a replica of the head in glass, the results obtained in this manner are inaccurate. Furthermore, because the size and mass of the optical system required is substantial, the device can not be used to test miniature flying magnetic heads, nor can it exhibit the dynamics of an actual spring mounted head weighing a small fraction of a gram. Thus, the apparatus cannot be used to test the characteristics of an a actual head.

A different version of this apparatus which determines the proximity of a rotating glass surface to another surface using frustrated total internal reflection is disclosed in U.S. Pat. No. 5,257,093 (issued to Mager et al in 1993). In that patent, a device is used to determine the gap between a real magnetic head and a surrogate magnetic disk, represented by a pair of glass lenses. One of the glass lenses may be set into motion to develop aerodynamic characteristics establishing the spacing between the surface of the glass lens and the magnetic head close to the actual device. The stationary second lens with two prisms is used to couple illumination energy into the surface undergoing frustration of the total internal reflection and to view and measure resulting internal reflection for purposes of determining the distance to the head.

Two lenses and two prisms required by this apparatus are physically large and heavy. The apparatus needs complicated alignment of prisms mounted to one of the surfaces. In order to withstand relative motion at several thousand revolutions per minute, these lenses must be fabricated to severe tolerances and must be placed in a strong housing in case they are broken while rotating. Furthermore, the rotating lens is subject to rapid deterioration and, therefore, requires frequent replacement. The replacement is followed by the procedure of full and complicated alignment. Thus, such system is costly, complicated and has a limited scope of application.

The above problem is solved in an apparatus described in a pending U.S. Patent application Ser. No. 08/476,626 of the same applicant. The apparatus described in this application utilizes an extremely simple single flat reference disk made of a transparent material such as glass. Light enters the disk from one side of the disk at an angle to the flat surface higher than the critical angle of the total internal reflection and propagates through the glass. When a magnetic head approaches the flat surface of the disk, frustration of the total internal reflection takes place. It is also known from the field of optics that the phenomenon of the frustrated total internal reflection is always accompanied by so-called photon-tunneling effect. This effect consists in ability of light to penetrate from a first medium to a third medium through a thin a thin second medium. The intensity of the light penetrated through the thin second medium, which in the case under consideration is a gap between the magnetic head and the reference disk, is complementary to the intensity of light reflected back into the reference disk in the case of the aforementioned frustrated total internal reflection.

In the apparatus of U.S. Patent application Ser. No. 08/476,626 a proximity of the magnetic head to the disk is measured as intensity of the light that left the disk due to photon tunneling and was scattered by the surface of the magnetic head. As the disk is transparent, the scattered light can be measured by a detector located on the side of the disk opposite to the head.

Although this measuring system is extremely simple and inexpensive, it produces a rather weak signal which is difficult to detect on a background of the noise. Such systems are suitable for testing small-batch production of magnetic heads, i.e., for conditions where the manufacture of more sensitive and accurate measurement systems may appear to be economically unjustified.

OBJECTS OF THE INVENTION

It is an object of the present invention to provide an apparatus for measuring a flying height and orientation of a magnetic head relative to a reference medium which is characterized by high accuracy in measuring nanometric gaps on the basis of a frustrated total internal reflection.

Another object of the invention is to provide an apparatus for measuring the gap between the head and the reference disk at several points on the magnetic head at the same time.

Still another object is to obtain a map of a magnetic head to reference disk surface proximity during a short period of time.

Yet another object of the invention is to provide an apparatus which is suitable for testing dynamic behavior and measuring the flying height of an actual magnetic head.

Further object of the invention is to provide an apparatus which is small in size and light in weight, does not need a complicated alignment procedure, and may be manufactured without strict tolerances.

Another object is to provide the aforementioned apparatus which is inexpensive to manufacture and to operate and which has a wide scope of practical application.

Finally, it is an object of the invention to provide an apparatus of the aforementioned type which is characterized by a high signal-to-noise ratio and is suitable for testing magnetic heads in mass production.

SUMMARY OF THE INVENTION

The invention provides an apparatus for measuring the flying height and orientation of a magnetic head relative to a transparent disk based on frustrated total internal reflection. In a preferred embodiment the apparatus comprises a housing that mounts an electric motor which rotationally supports the aforementioned disk. The disk has tapered lateral surface with light emitting means such as a laser installed on one side of the disk lateral surface and a light detecting means on a side of the disk diametrically opposite to the laser. The light is emitted from the laser and is directed to the disk perpendicular to the tapered lateral surface of the disk. The latter has a tapering angle of 45° so that the light is propagated through the body of the disk nominally with total internal reflection from two parallel surface of the disk into the body of the disk. As a result, when the magnetic head to be tested is absent, the light detecting means shows an area of homogeneous intensity of the reflected light.

When, however, the magnetic head approaches to the surface of the disk and is supported during rotation of the disk at a flying height, i.e., on an air cushion, the proximity of the head frustrates the total internal reflection. As a result, the intensity of the reflected light sensed by the detector is reduced. The degree of this reduction can be translated through appropriate electronic means and computer into the value of the flying height.

DESCRIPTION OF THE PREFERRED EMBODIMENT

Figure 1:
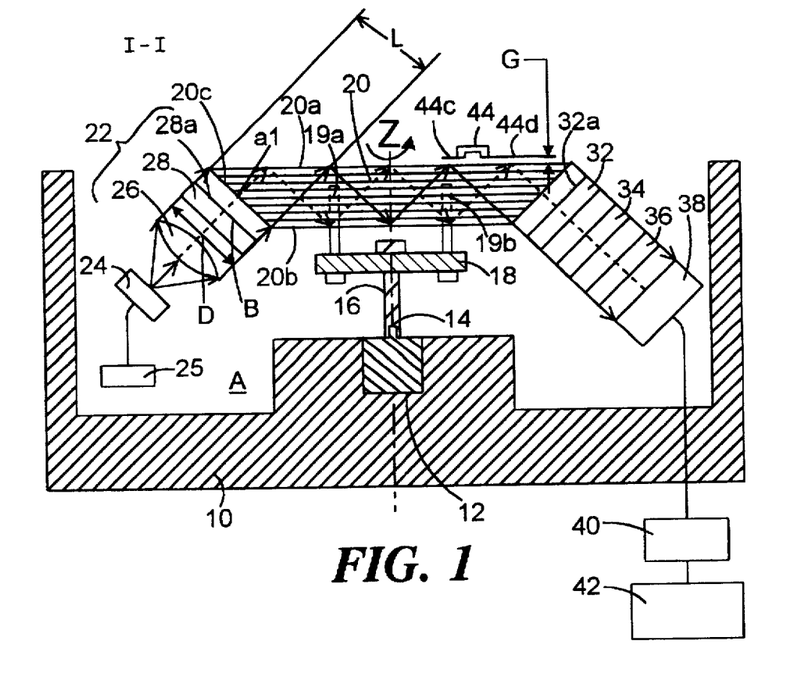
FIG. 1 is a schematic sectional view of the apparatus for measuring a flying height and orientation of a magnetic head with respect to a transparent disk in accordance with one embodiment of the invention.
Figure 2:
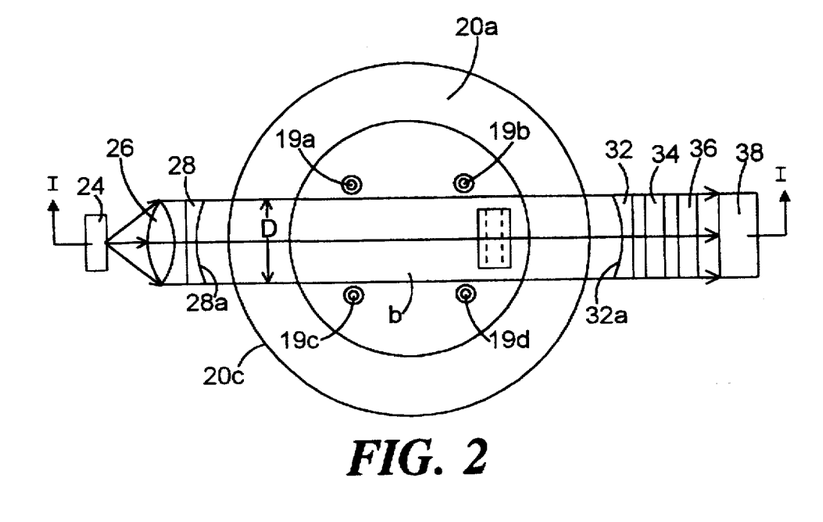
Fig. 2 is a fragment top view of the apparatus of FIG. 1.
Figure 3:
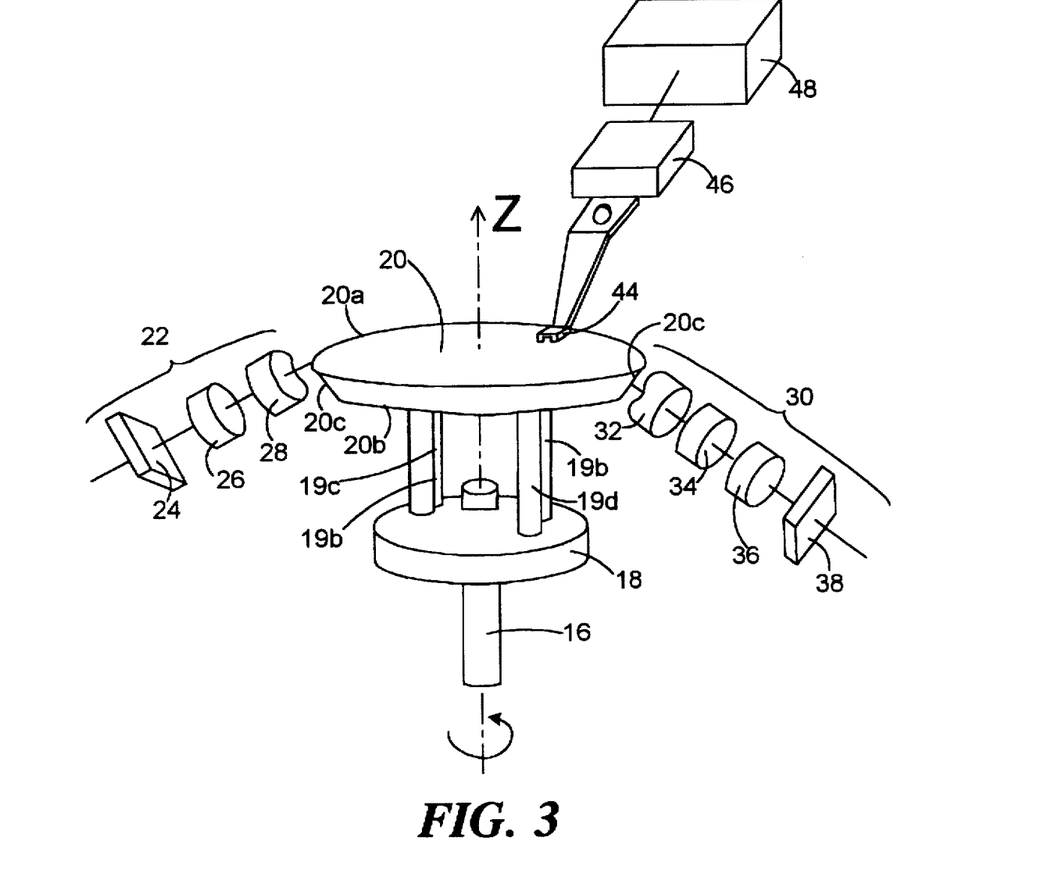
Fig. 3 is a schematic perspective view illustrating essential parts of the apparatus of FIGS. 1 and 2.

An apparatus made in accordance with one embodiment of the invention for measuring a flying height and orientation of a magnetic head with respect to a transparent reference disk is shown in FIGS. 1 through 3. FIG. 1 is a schematic side sectional view of the apparatus of the invention along the line I—I of FIG. 2, FIG. 2 is a top view of the apparatus of FIG. 1, and FIG. 3 is a perspective view of components of the apparatus of FIGS. 1 and 2.

As can be seen from the drawings, the apparatus has a housing 10 that supports an electric motor 12 with a vertically oriented and upwardly directed output shaft 14 having an axis of rotation Z. A spindle 16 is connected to output shaft 14 and supports a mounting plate 18.

A transparent reference disk 20 is attached to mounting plate 18 by means of four pins 19a, 19b, 19c, and 19d positioned on a rotary drive and support assembly. The disk 20 is extending into correspondingly positioned recesses in the surface 20b. The center of the disk coincides with axis of rotation Z. The pins 19a through 19d are equally displaced from a rotation axis Z leaving the center interior region of disk 20 transparent to propagation of the light. As shown, the pins 19a, 19b, 19c and 19d extend partially through disk 20. Disk 20 is a conic frustum having two parallel surfaces, i.e., a first plane surface 20a and a second plane surface 20b, and a lateral tapered surface 20c between first surface 20a and second surface 20b. In the illustrated embodiment, tapering surface 20c converges in the downward direction at an angle equal to 45° to the planes of first and second surfaces 20a and 20b. The entire surface of disk 20 is polished to optical quality of 1nm rms or higher. A diameter D1 of first surface 20a of disk 20 and a diameter D2 of second surface 20b of disk 20 are equal to an even number of the disk thicknesses T, and preferably D1−D2= 2T. In the preferred embodiment disk 20 is made of glass, preferably, of the type of a glass used as a substrate in conventional magnetic disks. The index of refraction of the disk glass IR1 is about 1.52. The disk 20 is optically transparent at least in the channel region 49.

The apparatus also contains an illumination assembly 22 that is secured in housing 10, e.g., by bolts (not shown in the drawing). Illumination assembly 22 consists of a light source such as a laser 24, e.g., a semiconductor diode laser (with the wavelength of 670 nm) driven by a power supply 25 and am associated coupler for coupling light to the interior of disk 20. The coupler includes a collimating lens 26, and a piano-concave lens 28. Laser 24, collimating lens 26, and piano-concave lens 28 are arranged sequentially in the direction of light emitted from laser 24. Plano-concave lens 28 is made of the same material as disk 20. As can be seen from FIG. 2, plano-concave lens 28 has on its surface 28a facing the tapered surface of disk 20 the same curvature as the aforementioned tapered surface 20c. Surface 28a is spaced from tapered surface 20c at a very short distance of about 0.03 to 0.1 mm.

A detector assembly 30 is supported in housing 10 near tapered surface 20c on the side of disk 20 opposite to illumination assembly 22. Detector assembly 30 includes a coupler comprising a plano-concave lens 32, an interference filter 34, and a polarizing filter 36, and a detector 38, all aforementioned elements being arranged sequentially in the direction of propagation of the light from illumination assembly 22. Plano-concave lens 32 is made of the same material as disk 20 and has on its surface 32a facing the tapered surface of disk 20 the same curvature as the aforementioned tapered surface 20c. Surface 32a is spaced from tapered surface 20c at a very short distance of about 0.03 to 0.1 mm. Interference filter 34 passes only the light on the operation wavelength and cuts the light with other wavelengths, i.e., the background light.

In order to increase a signal-to-noise ratio, polarizing filter 36 is arranged to pass to detector only the light which is linearly polarized along the axis perpendicular to the surfaces 20a and 20b. Detector 38 generates a signal representative of light coupled from the disk 20. Detector 38 may be a rectangular charge coupled device (CCD) camera or a set of three fast photodiodes. Detector 38 is connected to a data analyzing unit, e.g., a computer 40 for analyzing output signals of detector 38. Computer has a display unit 42 that shows the results of the analysis, which are generally indicative of the position of the magnetic head relative to surface 20a.

A magnetic head 44 to be tested is mounted on a magnetic head support assembly in which a head loader 46 is fixed in a positioner 48 that allows accurate positioning of the head at any desired point above surface 20a of disk 20 and changing the angle of the head relative to the radius of disk 20-so-called "skew angle" of the magnetic head. The positioner suitable for this purpose may be the one described in U.S. Pat. No. 5,254,946 issued to the same applicant in 1993.

Disk 20 is rotated in a fluid environment A (FIG. 1), such as air, but may alternatively be a liquid contained in the interior of housing 10. It is essential for the material of disk 20 to have refractive index IR1 higher than that of the surrounding environment IR2. In case of air, the refractive index of the environment IR2 is equal approximately to 1.00.

DESCRIPTION OF THE APPARATUS OPERATION

For the beginning of the operation of the apparatus, light source 24 is switched on. As a result, a light from light source 24 passes through collimated lens 26 whereby the light is converted into a collimated light beam B having a diameter D equal to the side length L of surface 20c of disk 20 (FIG. 1). Plano-concave lens 28 allows for the beam to pass through tapered surface 20c in a collimated state (FIG. 2).

Figure 4:
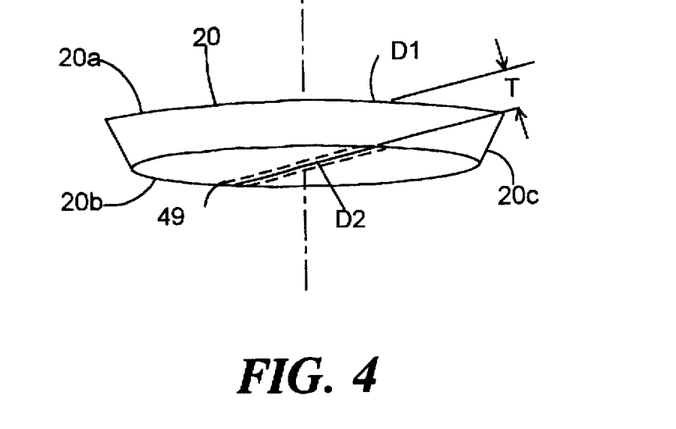
Fig. 4 is a schematic perspective view illustrating glass disk and a channel region inside where light is propagated.

As can be seen from FIG. 1, beam B enters disk 20 perpendicular to surface 20c and at an angle of 45° to surfaces 20a and 20b that is higher than the critical angle 41° of total internal reflection from a glass-air interface. In FIG. 1, positions of such interfaces coincide with surfaces 20a and 20b. In other words, in the course of its propagation through the material of disk 20, light beam B undergoes multiple total internal reflections from surfaces 20a and 20b and has a saw-tooth like path. Light beam B propagates in a channel region 49 (Fig.4) extending along and between overlying diameters of surfaces 20a and 20b.

Because, as has been mentioned above, diameters D1 and D2 of first and second surfaces 20a and 20b of disk 20 are equal to an even number of the disk thicknesses T the light exits disk 20 at the side of detector assembly 30 with the position of the beam on the exit surface being the same as on the entrance surface (FIG. 1). In other words, e.g., a light entering point $a_1$ on surface 20c on the light source side corresponds to light exit point $a_2$ on the detector side of surface 20c. Furthermore, the projection of beam B on surface 20a (FIG.2) is symmetrical with respect to the disk center. As shown in FIG. 1, D1 =6T and D2=4T where light beam B reflects three times at surface 20b. In an alternate embodiment where D1=4T and D2=2T, light beam B reflects only one time at surface 20b.

After exiting from disk 20, light beam B sequentially passes through plano-concave lens 32 that keeps it in a collimated state, interference filter 34, polarizing filter 36, and enters detector 38. The latter converts the signals of optical intensity of the beam into electrical signals that are sent to computer 40. Computer 40 analyses the electrical signals and shows the results of the analysis on display 42.

Figure 5A:
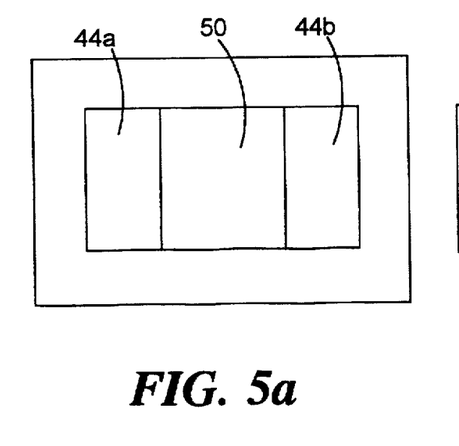
Fig. 5a shows a sensing area of the apparatus in the form of a charge coupled device sensor array.

In the case of detector 40 in the form of a CCD sensor array, the results are displayed as a rectangular region 50 corresponding to the configuration of sensing area of the CCD sensor array. This is shown in Fig. 5a. In the event disk 20 is ideal and the light beam is homogeneous, the entire region 50 will have a constant brightness.

A head 44 is then accurately positioned with the use of aforementioned positioning mechanism 48 at a required place above the area of surface 20a corresponding to the projection of propagating beam B on surface 20a (FIG.2). The magnetic head is then moved toward surface 20a of disk 20. Disk 20 is brought into rotation about central axis Z by motor 12 at a speed of about 4000 rpm, so that a relative air flow supports magnetic head 44 in a floating state on an air cushion, i.e., at a some distance from disk 20. This distance or gap G may be on the order of 20 to 30 nm. When gap G is small enough, frustration of the total internal reflection at the points under the head surface takes place. This decreases the intensity of light reflected from the surface 20a into the body of disk 20 in the area where head 44 is located. As a result, an image of head 44 will be reproduced on computer display 42 with a decrease of brightness in area of head 44 that are closer to surface 20a. These areas of reduced brightness are shown in FIG. 5a as strips 44a and 44b corresponding to project portions 44c and 44d of magnetic head 44.

As has been mentioned above, the aforementioned brightness has a functional dependence on a ratio of the gap to the optical wavelength, etc. Therefore the computer output data can be converted into absolute values of gap G.

As disk 20 rotates, for a part of the time, light beam B will be shuttered by pins 19 (FIG. 2). To avoid scattering of light and increase the signal-to-noise ratio, both source 24 and detector 38 are synchronously electronically shuttered for the time intervals when the beam encounters pins 19. For a CCD sensor array, the shuttering can be performed with the use of an electronic shutter that is normally an integral part of a standard CCD camera and therefore is omitted from the description. In the case of a laser source, shuttering can be achieved on a current-modulation principle by means of power supply 25 in a manner known in the art.

OTHER EMBODIMENTS OF THE INVENTION

The apparatus of the invention may have detector 38 in the form of a set of fast photodiodes. One embodiment of such a detector is shown schematically in FIG. 5b in the form of three fast small-area photodiodes P1, P2, and P3 located in specific points corresponding to specific points on surface 20a within the outlines of the projection of head 44 on surface 20a.

Figure 5B:
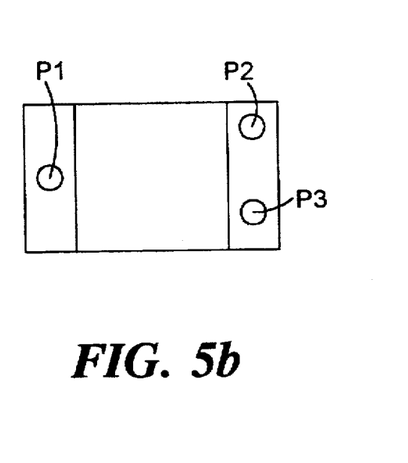
Fig. 5b shows a sensing area of the apparatus in the form of a fast photo-diode system.

The apparatus of the invention with the detector of this embodiment operates in the same manner as the apparatus of the first embodiment, with the exception that the intensities of the light reflected from surface 20a are determined at the aforementioned three specific points. The intensities measured in the aforementioned points are recalculated through the known relationships into the values of gaps at these points. In other words, the measurement at three points provides complete information on the relative position and orientation of head surfaces 44c and 44d with respect to disk surface 20a.

Figure 6:
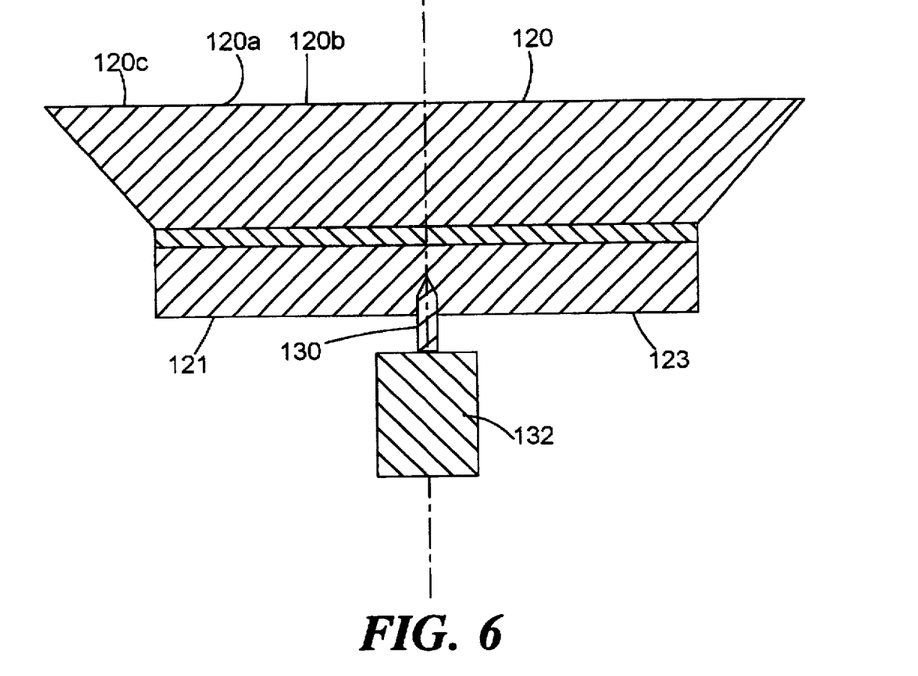
Fig. 6 is a view similar to that shown in FIG. 1 but with another embodiment of means for attaching the transparent disk to the electric motor.

FIG. 6 shows a third embodiment of the invention in which a disk 120 is covered on its bottom surface 120b with a reflection coating 121 and is attached, e.g., by means of an adhesive substance, to a support disk, e.g., another glass disk 123 which in turn is attached to a shaft 130 of an electric motor 132. In this embodiment, the apparatus is free of pins 19a, 19b, 19c, and 19d that shutter the light beam during rotation of the disk. Therefore in this embodiment, there is no need to shutter the detector and the light source. Otherwise, the system operates in the same manner, as described above.

BROADENING, RAMIFICATIONS, AND SCOPE

Thus it has been shown that the present invention provides an apparatus for measuring a flying height and orientation of a magnetic head relative to transparent medium which is characterized by high accuracy in measuring nanometric gaps on the basis of a frustrated total internal reflection. The apparatus of the invention allows measuring of the gap between the head and the reference disk at several points on the magnetic head at the same time. The invention also allows obtaining of a map of a magnetic head to reference disk surface proximity during a short period of time. The invention makes it possible to test dynamic behavior and measure the flying height of an actual magnetic head. The apparatus of the invention is small in size and light in weight, does not need a complicated alignment procedure, and may be manufactured without strict tolerances. The aforementioned apparatus is inexpensive to manufacture and to operate and has a wide scope of practical application. Finally, the apparatus of the invention is characterized by a high signal-to-noise ratio and is suitable for testing magnetic heads in mass production.

Although the invention has been described by way of practical examples with reference to specific embodiments, it is understood that the scope of practical application of the invention is not limited to these embodiments and that various modifications are possible without departure from the attached claims. For example, light source 24 may be an incandescent source or a light emitting diode, also it may include fiber optics. The lateral tapered surface of the disk may be coated with an antireflecting coating. Lenses 28, 32 and filters 34, 36 may be omitted at the expense of a worse spatial resolution and signal-to-noise ratio. Both CCD sensor array and a set of photodiodes may be combined into an integral system with the use of a beam splitter. In addition, the first and second planes of the disk may be reversed with respect to the position of the head. Furthermore, the angle between the tapering angle of disk 20 and the angle between the light beam B and plane surfaces 20a and 20b of disk 20 may differ from 45° at the expense of a worse signal-to-noise ratio.

What is claimed is:

1. An apparatus for measuring the position of a magnetic head relative to a rotating planar surface, comprising:
   A. a disk having thickness T and characterized by an index of refraction IR1, said disk being positioned in a fluid medium characterized by an index of refraction IR2, where IR1 is greater than IR2, and said disk having a planar circular first surface having a diameter D1, a planar circular second surface having a diameter D2, and a lateral surface extending between said first surface and said second surface, said first and second surfaces being perpendicular to and disposed about a common central axis, and said disk including at least one channel region therein extending along and between overlying diameters of said first and second surfaces, said channel region being optically transparent,
   B. a magnetic head support assembly including means for selectively supporting the magnetic head near said first surface,
   C. a rotary drive and support assembly for supporting said disk at said second surface and for selectively rotating said disk about said central axis whereby a magnetic head supported by said support assembly is separated at least in part by fluid dynamic forces from said first surface by a gap G,
   D. a light source and associated coupler for coupling light through said lateral surface and into said disk in part in a direction angularly offset with respect to said central axis, whereby said coupled light is substantially totally internally reflected between said first and said second surfaces, and
   E. a light detector and associated coupler positioned opposite said light source and associated coupler, for coupling light from said channel region and through said lateral surface to said detector including means for generating a signal representative of said light coupled thereto, said signal being representative of the position of said magnetic head relative to said first surface.

2. Apparatus according to claim 1 wherein D1 is greater than D2.

3. Apparatus according claim 2 wherein D1, D2 and T are such that said disk is a conic frustum with a lateral surface at an angle 45 degrees with respect to said central axis.

4. Apparatus according to claim 3 wherein D1, D2 and T are such that light entering said disk through said lateral surface at said light source and associated coupler reflects only one time from said second surface before reaching said lateral surface at said detector and associated coupler.

5. Apparatus according to claim 3 wherein D1−D2=2T.

6. Apparatus according to claim 5 wherein D1=nT where n is an even integer.

7. Apparatus according to claim 6 wherein n=4.

8. Apparatus according to claim 2 wherein said second surface includes a plurality of recesses extending from points dispersed about said central axis and upward into the interior region of the disk, said recesses being exterior to said channel region, and wherein said support assembly includes a rotatable member and a plurality of drive elements extending outwardly, lower therefrom and toward said disk, each of said drive elements corresponding in shape and position to an associated one of said recesses, and extending into said associated recess.

9. Apparatus according to claim 8 wherein said recesses extend only partially through said disk.

10. Apparatus according to claim 8 further comprising a controller coupled to said light source, including means for periodically activating said light source in synchronism with said rotation of said disk.

11. Apparatus according to claim 10 wherein said light detector includes a charge coupled device.

12. Apparatus according to claim 10 wherein said light detector includes at least three fast photodiodes.

13. Apparatus according to claim 3 wherein said second surface includes a plurality of recesses extending from points dispersed about said central axis and upward into the interior region of the disk, said recesses being exterior to said channel region, and wherein said support assembly includes a rotatable member and a plurality of drive elements extending outwardly, lower therefrom and toward said disk, each of said drive elements corresponding in shape and position to an associated one of said recesses, and extending into said associated recess.

14. Apparatus according to claim 13 wherein said recesses extend only partially through said disk.

15. Apparatus according to claim 13 further comprising a controller coupled to said light source, including means for periodically activating said light source in synchronism with said rotation of said disk.

16. Apparatus according to claim 15 wherein said light detector includes a charge coupled device.

17. Apparatus according to claim 15 wherein said light detector includes at least three fast photodiodes.

18. Apparatus according to claim 6 wherein said second surface includes a plurality of recesses extending from points dispersed about said central axis and upward into the interior region of the disk, said recesses being exterior to said channel region, and wherein said support assembly includes a rotatable member and a plurality of drive elements extending outwardly, lower therefrom and toward said disk, each of said drive elements corresponding in shape and position to an associated one of said recesses, and extending into said associated recess.

19. Apparatus according to claim 18 wherein said recesses extend only partially through said disk.

20. Apparatus according to claim 18 further comprising a controller coupled to said light source, including means for periodically activating said light source in synchronism with said rotation of said disk.

21. Apparatus according to claim 20 wherein said light detector includes a charge coupled device.

22. Apparatus according to claim 20 wherein said light detector includes at least three fast photodiodes.

23. Apparatus according to claim 1 wherein said second surface includes a plurality of recesses extending from points dispersed about said central axis and upward into the interior region of the disk, said recesses being exterior to said channel region, and wherein said support assembly includes a rotatable member and a plurality of drive elements extending outwardly, lower therefrom and toward said disk, each of said drive elements corresponding in shape and position to an associated one of said recesses, and extending into said associated recess.

24. Apparatus according to claim 23 wherein said recesses extend only partially through said disk.

25. Apparatus according to claim 23 further comprising a controller coupled to said light source, including means for periodically activating said light source in synchronism with said rotation of said disk.

26. Apparatus according to claim 25 wherein said light detector includes a charge coupled device.

27. Apparatus according to claim 25 wherein said light detector includes at least three fast photodiodes.

28. Apparatus according claim 1 further comprising an optically reflective surface at said second surface facing the interior region of said disk.

29. Apparatus according claim 28 wherein said support assembly includes a support surface thereof disposed adjacent to at least a central portion of said second surface of said disk and includes an adhesive between said support surface and said central portion, whereby said disk is rigidly coupled to said support surface.

30. Apparatus according claim 1 wherein said support assembly includes a support surface thereof disposed adjacent to at least a central portion of said second surface of said disk and includes an adhesive between said support surface and said central portion, whereby said disk is rigidly coupled to said support surface.

31. Apparatus according claim 1 further comprising a housing disposed about said first surface and said lateral surface of said disk and said magnetic head support assembly.

32. Apparatus according to claim 1 further comprising a controller coupled to said light source, including means for periodically activating said light source in synchronism with said rotation of said disk.

33. Apparatus according to claim 1 wherein said coupler associated with light source includes a collimator lens assembly.

34. Apparatus according to claim 1 wherein said detector includes means for generating a signal representative of the intensity distribution of light coupled from said channel region of said disk.

35. Apparatus according to claim 1 wherein said light detector includes a charge coupled device.

36. Apparatus according to claim 1 wherein said light detector includes at least three fast photodiodes.

37. Apparatus according to claim 1 wherein said first surface is uppermost surfaces of said disk.

38. Apparatus according to claim 1 wherein said first surface is lowermost surfaces of said disk.

39. Apparatus according to claim 1 wherein said disk is glass.

40. Apparatus according to claim 1 wherein said fluid is air.

41. Apparatus according to claim 1 wherein said disk is transparent.

* * * * *